J. S. BOSSERMAN.
FISH HOOK.
APPLICATION FILED DEC. 11, 1913.
1,154,168.      Patented Sept. 21, 1915.
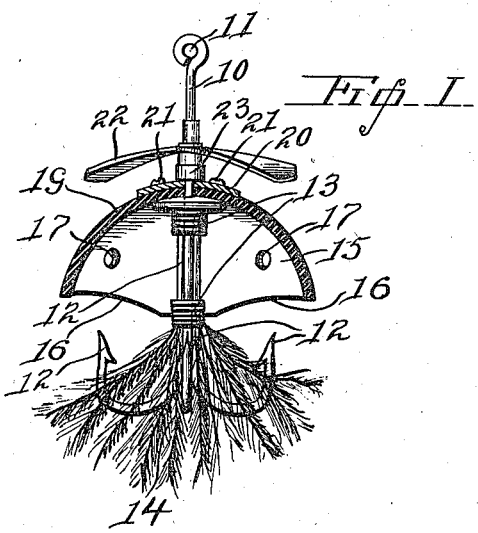
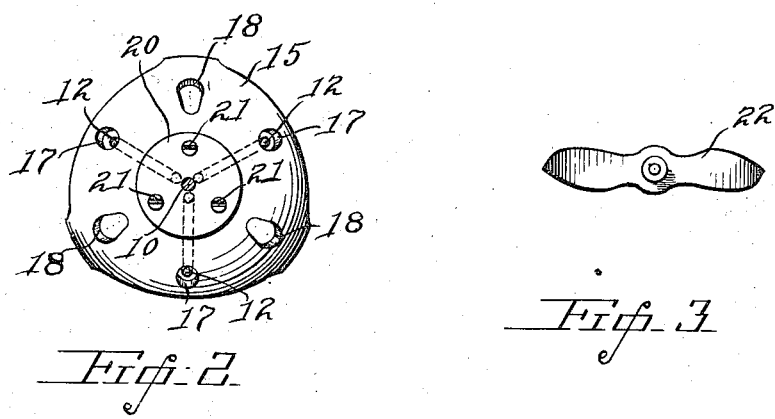

UNITED STATES PATENT OFFICE.

JOSEPH S. BOSSERMAN, OF SEDALIA, MISSOURI.

FISH-HOOK.

1,154,168.  Specification of Letters Patent.  Patented Sept. 21, 1915.

Application filed December 11, 1913. Serial No. 806,032.

*To all whom it may concern:*

Be it known that I, JOSEPH S. BOSSERMAN, a citizen of the United States, residing at Sedalia, in the county of Pettis and State of Missouri, have invented certain new and useful Improvements in Fish-Hooks, of which the following is a specification.

This invention relates to an improved fish hook, and the principal object of the invention is to provide the hook with an improved hood which is made of rubber or some other flexible material and which is provided to prevent the hooks from coming in contact with grass or other obstructions in the water such as logs or rocks.

Another object of the invention is to so shape the hood that a light pressure thereon will compress the hood a sufficient amount to permit the hooks to catch in the fish's mouth.

Another object of the invention is to provide an improved means for connecting the hood with the shank of the hooks, this means comprising a disk which is rigidly connected with the shank.

Another object of the invention is to provide improved means for connecting the hood with the secure disk and prevent the hood from being torn loose.

This invention is illustrated in the accompanying drawings wherein—

Figure 1 is a view of the lower hook with the hood shown in section and the remaining portions of the hook in elevation; Fig. 2 is a top plan view of the hood with the upper portion of the shank removed; Fig. 3 is a plan view of the spinner which is rotatably mounted upon the shank of the hook above the hood.

This invention comprises the shank 10 which has its upper-end portion bent to form the eye 11 by means of which the hook may be connected with a suitable lead. The hooks 12 are placed about the lower-end portion of the shank and are held in place by the binding threads 13. The hooks 12 are provided with a suitable covering 14 which is formed of feathers or any other suitable material, the feathers being connected with the hooks by means of the improved binding 13.

The hood 15 which is the principal feature of my improved device is preferably formed of rubber, but may be formed of any other suitable material which is flexible, and may be either bell-shaped as shown in the drawings, or may be spherical or conical or any other suitable shape desired. This hood must, however, be provided with scalloped edges as shown at 16, the scallops being cut so that the points of the hooks 12 will be located at the center of the scallops as shown at Fig. 2 and thus permit the points of the hooks to extend beyond the edges of the hood when the hood is compressed by the fish's mouth.

Openings 17 and 18 are formed in the hood to permit the water to pass freely through the hood and thus permit the improved bait to drag freely through the water. This hood 15 is placed upon the shank 10 and engages the disk 19 which is rigidly mounted upon the shank, the hood being held to the disk by means of a plate 20 and screws 21. The usual spinner 22 is mounted upon the shank between the hood and the eye 11 and is held in spaced relation from the hood by means of the collar 23.

When this artificial bait is in use, the spinner attracts the fish in the ordinary manner and when the fish attempts to swallow the bait, the hood will be compressed, thus causing the hooks 12 to project beyond the scalloped portions of the hood and penetrate the fish's mouth. The fish can then be removed and the hood will spread again and the fishing resumed. The hood prevents danger of the hooks catching in logs or sea weeds while trolling, and thus prevents any danger of the hooks or line being broken. The hood is prevented from turning upon the shank 10 due to the fact that the disk is rigidly secured to the shank and is prevented from being torn loose from the disk due to the fact that the hood is secured to the disk by the plate 20 and screws 21. It will thus be seen that the disk can not turn to disarrange the relative relation of the hooks and hood shown in Fig. 2, and that the hooks will therefore at all times be in the right position to catch the fish when the hood is compressed.

What is claimed is:

1. An artificial bait of the character described comprising a shank, hooks carried by said shank, a disk rigidly mounted upon said shank, a hood mounted upon said shank, a plate mounted upon said shank, means passing through said plate and hood into said disk for securing said hood and plate to said disk, said hood being provided with cut-out edge portions permitting the points of the hooks to extend beyond the edges of said hood when said hood is compressed by the fish taking the bait.

2. An artificial bait of the character described comprising a shank, hooks carried by said shank, a disk rigidly mounted upon said shank, and a hood rigidly secured to said disk, said hood terminating short of the points of said hooks and forming a yieldable protector for said hooks and the space between the same.

3. An artificial bait comprising a shank, hooks carried by said shank, and a hood connected with said shank and formed of a single piece of yieldable material, terminating short of the points of said hooks and forming a continuous protector for the hooks and space between the same and having a greater diameter at its free edge than the distance between the points of said hooks.

4. An artificial bait comprising an attaching element, hooks extending from said attaching element, and a hood forming a continuous protector for the points of the hooks and the space between the points of the hooks, said hood being formed of a single piece of yieldable material and rigidly connected with said carrying element and having its free edge portion terminating short of the points of said hooks.

5. An artificial bait comprising a carrying element, hooks extending from said carrying element, and a continuous protector for said hooks formed of a single piece of yieldable material rigidly connected with said carrying element and terminating short of the points of said hooks and being of greater diameter at its free edge than the distance between the points of said hooks.

6. An artificial bait of the character described comprising a carrying element, hooks carried by said carrying element, and a continuous protector for said hooks and the space between the same, said protector being rigidly connected with said carrying element and terminating short of the points of said hooks.

In testimony whereof I affix my signature in presence of two witnesses.

JOSEPH S. BOSSERMAN.

Witnesses:
STANLEY SHORTRIDGE,
JOHN W. BAKER.